United States Patent [19]
Andrieu et al.

[11] Patent Number: 5,811,205
[45] Date of Patent: Sep. 22, 1998

[54] BIFUNCTIONAL ELECTRODE FOR AN ELECTROCHEMICAL CELL OR A SUPERCAPACITOR AND A METHOD OF PRODUCING IT

[75] Inventors: Xavier Andrieu, Bretigny sur Orge; Laurence Josset, St Cheron, both of France

[73] Assignee: SAFT, Romainville, France

[21] Appl. No.: 700,381

[22] PCT Filed: Dec. 27, 1995

[86] PCT No.: PCT/FR95/01742

§ 371 Date: Aug. 16, 1996

§ 102(e) Date: Aug. 16, 1996

[87] PCT Pub. No.: WO96/20504

PCT Pub. Date: Jul. 4, 1996

[30] Foreign Application Priority Data

Dec. 28, 1994 [FR] France ................................... 94 15790

[51] Int. Cl.⁶ ...................................................... H01M 2/14
[52] U.S. Cl. ........................... 429/137; 427/79; 427/246; 427/388.2
[58] Field of Search ........................... 429/137; 29/623.5; 427/79, 245, 246, 388.2

[56] References Cited

U.S. PATENT DOCUMENTS

| | | |
|---|---|---|
| 3,023,261 | 2/1962 | Louis et al. |
| 4,524,509 | 6/1985 | Wegner ................................. 29/623.5 |
| 4,885,007 | 12/1989 | Wegner ................................. 29/623.5 |
| 5,437,692 | 8/1995 | Dasgupta et al. ................. 29/623.5 X |
| 5,503,946 | 4/1996 | Fauteux et al. .................... 29/623.5 X |
| 5,637,421 | 6/1997 | Poehler et al. ..................... 29/623.5 X |

FOREIGN PATENT DOCUMENTS

| | | |
|---|---|---|
| 0038885A1 | 11/1981 | European Pat. Off. . |
| 0243653A3 | 11/1987 | European Pat. Off. . |
| 0600718A3 | 6/1994 | European Pat. Off. . |
| 0618629A1 | 10/1994 | European Pat. Off. . |

OTHER PUBLICATIONS

*Chemical Abstracts*, vol. 118, No. 16, 19 Apr. 1993, Columbus, OH, Abstract No. 149044, Takehata, Koji et al, "Continuous microporous–containing fluropolymer membranes", XP002001519–see abstract—JP A 04 239 041 (Mitsubishi Rayon Co., Ltd., Japan).

*Primary Examiner*—Stephen Kalafut
*Attorney, Agent, or Firm*—Sughrue, Mion, Zinn, Macpeak & Seas, PLLC

[57] ABSTRACT

The present invention concerns an electrode for an electric cell or supercapacitor containing a non-aqueous liquid electrolyte, the electrode comprising an electronically conducting porous first layer including at least one first face covered with a microporous second layer constituted by a polymeric material, the electrode being characterized in that said second layer is produced by coagulation of said polymer from a solution of said polymer impregnating said first face.

18 Claims, 3 Drawing Sheets

BIFUNCTIONAL ELECTRODE FOR AN ELECTROCHEMICAL CELL OR A SUPERCAPACITOR AND A METHOD OF PRODUCING IT

The present invention relates to a bifunctional electrode for an electrochemical cell or a supercapacitor. It also relates to a method of producing it.

The electrodes in conventional supercapacitors and electrochemical cells are separated by a layer of porous insulating material which is impregnated with electrolyte. That separator constitutes a separate component, which is usually commercially available, which is assembled with the other components during assembly of the electrochemical element (cell or supercapacitor). It must therefore have sufficient intrinsic mechanical strength for it to be capable of being manipulated and of resisting the stresses of automated industrial production. Those components have the problem of being expensive and not specifically adapted to the type of cell in which they are used. Conventional separators limit improvements in the performance of electric cells and supercapacitors.

In order to facilitate assembly of the components, a separator supported by an electrode has been proposed. The porous sheet acting as a separator may be manufactured initially, and it is then applied to the electrode by mechanical means such as rolling or coextrusion with the metal of the electrode (European patents EP-0 219 190 and EP-0 243 653), or by a chemical method, such as using an adhesive (EP-0 195 684). The operation is difficult to perform without damaging the separator, which means a thick, mechanically strong separator must be used. Further, the adhesion obtained is imperfect and the risk of delamination is high if the dimensions of the electrode vary.

The separator can also be formed directly on the electrode which acts as a support.

As an example, one method consists of depositing, on the electrode, separator material in the form of a continuous layer which is rendered porous during a subsequent operation, normally by means of a pore-forming additive added to the material. European patent applications EP-0 143 566 and EP-0 146 246 describe a metallic lithium electrode on which a non-porous layer of a protective material is deposited, for example by rolling or extrusion. That material is then rendered porous by reaction with one of the electrode components or by the presence of an additive. That method involves several operations and the use of pore-forming additives whose choice is limited to those which are completely eliminated or to those which are compatible with the components and operating conditions of the electrochemical element.

Other methods deposit a porous layer directly onto a solid metal electrode. European patent application EP-0 143 562 describes the deposition of a porous layer on a lithium electrode from a solution which is then evaporated off. In other methods, deposition of a monomer in solution can be followed by polymerization in situ.

U.S. Pat. Nos. 4,885,007 and 4,524,509 describe a method of enveloping lead electrodes in a microporous separator. That method consists of immersing the electrodes in a coating solution containing a polymer and a filler, then drying in air. The set of operations is repeated a number of times to obtain a separator with sufficient thickness. That method requires a number of manipulations.

U.S. Pat. No. 3,023,261 describes a method of producing an electrode-separator assembly for secondary cells containing an aqueous alkaline electrolyte. The electrodes are immersed in a solution containing a synthetic resin which is insoluble in water and a polymer which swells in water, then washing with water to eliminate any traces of solvent. The polymer which swells in water is intended to give the electrolyte access to the electrode. It is advisable to use the maximum quantity of that polymer without compromising the mechanical strength of the separator. The characteristics of the separator obtained essentially depend on the choice and concentration of polymer which swells in water.

Known methods of forming the separator directly on the electrode can improve adhesion between the separator and the electrode. However, those methods include a number of steps and often use forming additives which may have an undesirable effect on the operation of the electrochemical element.

An object of the present invention is to provide an electrode which also acts as a separator which is simpler and easier to manufacture than using known methods.

In one aspect, the present invention provides an electrode for an electrochemical cell or supercapacitor containing a non-aqueous liquid electrolyte, the electrode comprising an electronically conducting porous first layer including at least one first face covered by a second microporous layer constituted by a polymeric material, the electrode being characterized in that said second layer is produced by coagulation of said polymer from a solution of said polymer impregnating said first face.

The electrode of the invention thus simultaneously acts as the seat of the electrochemical reaction which uses the active material contained in the first layer, and as the separator formed by the microporous second layer which is impregnated with the liquid electrolyte introduced into the cell or supercapacitor. The first and second layers are thus intimately connected to each other and they can follow any dimensional variations in the electrode during cycling.

Preferably, the pore volume of the second layer is in the range 30% to 95%. A porosity of more than 95% affects the mechanical strength of the separator, while if the porosity is insufficient, then the second layer introduces too high a series resistance.

Preferably, the thickness of the second layer is in the range 10 $\mu$m to 100 $\mu$m. If the second layer is too thin, the material distribution will be non-uniform and the mechanical strength of the separator will be insufficient (perforation risk). Increasing the thickness of the second layer beyond 100 $\mu$m does not improve cell performance, but does reduce the capacity per unit volume by increasing the volume occupied by the separator.

The polymers constituting the second layer are selected for their ability to withstand operating conditions and their chemical inertness to the components of the electrochemical cell or supercapacitor.

In a first variation, the second layer is constituted by a polymeric material selected from poly(vinylidene fluoride) (PVDF), poly(vinyl chloride) (PVC), poly(methyl methacrylate), cellulose triacetate (CA), a polysulfone, a polyether, a polyolefin such as polyethylene (PE), poly (ethylene oxide) (PEO), polypropylene (PP) and copolymers thereof.

In a second variation, the second layer is constituted by a polymeric material which is an alloy of poly(vinylidene fluoride) PVDF ($CH_2$—$CF_2$) with a polymer selected from a polysulfone, poly(methyl methacrylate), poly (vinylpyrrolidone), and copolymers of poly(vinylidene fluoride) and poly(tetrafluoroethylene) (PTFE), of poly (vinylidene fluoride) and propylene hexafluoride, or of poly (vinyl acetate) (PVAC) and poly(vinyl alcohol) (PVA).

PVDF has high mechanical strength and good electrochemical characteristics, and its alloys have good fatigue and abrasion resistance.

In some cases, it is necessary to add a wetting agent to the second layer in an amount of less than 10% by weight of polymer. This agent can improve penetration and distribution of the electrolyte in the separator.

In an embodiment of the invention, the second layer is constituted by a cross-linked polymeric material. The structure of the polymer is thus rendered more rigid, and when the material is impregnated with electrolyte, swelling remains low.

The first layer of the electrode is formed in known fashion depending on the type of cell or supercapacitor to be produced.

When the mechanical strength of the first layer is insufficient, or when the first layer is not sufficiently conductive, the electrode of the invention also includes a current conducting support. This support may be constituted, for example, by a metal foil, an expanded metal, or a metal grid or fabric.

In a first embodiment of the invention, the support is in contact with the first face of the first layer and the second layer adheres to the second face of the first layer. The electrode is a stack composed of the support, the first layer containing the active material, and the second polymeric layer.

In a second embodiment of the invention, the support is included in the first layer and the second layer adheres to the first face and the second face of the first layer. For example, the support can be placed in the center of the first layer and each of the two faces of the first layer is covered with the second polymeric layer.

In a further aspect, the present invention provides a supercapacitor including an electrode in which the first layer contains an electrochemically active material selected from activated charcoal and an oxide of a transition metal oxide such as iridium or ruthenium, and a second layer constituted by poly(vinylidene fluoride).

An electrode of this type is particularly suitable for a supercapacitor containing an organic electrolyte. The supercapacitor includes at least one electrode in accordance with the invention but it may also include both an electrode and a counter-electrode which are in accordance with the invention.

In a still further aspect, the invention provides an electrochemical cell comprising an electrode in which the first layer contains an electrochemically active material selected from materials which can intercalate an alkaline cation, and a second layer constituted by poly(vinylidene fluoride). An electrode of this type is particularly intended for use in a lithium electrochemical cell. The electric cell can include an electrode (anode or cathode) in accordance with the invention, and a conventional counter-electrode; it also contains a non-aqueous electrolyte composed of a lithium salt in an organic solvent. The electrochemical cell can also include both a cathode and an anode in accordance with the invention placed face to face, such that the second layer of each electrode is in contact with that of the other. In which case, the thickness of the second layer in each electrode is adjusted accordingly.

For a lithium electrochemical cell, the material which can intercalate a lithium ion is, for example, graphite or coke for an anode, or for a cathode, a lithiated or non lithiated oxide of a transition metal such as manganese, vanadium, nickel, cobalt, chromium, or titanium.

The use of an electrode in accordance with the present invention means that the separator as a distinct component can be omitted while the ionic percolation in and mechanical strength of the electric cell are improved. The second layer can have a high porosity and thus retain a sufficient quantity of electrolyte to ensure a maximum lifetime for the cell or the supercapacitor. An electrode of this type can be used with the majority of non-aqueous electrolyte solvents.

The electrode of the present invention can increase the reliability of cells or supercapacitors containing it, and improve their performance per unit volume and per unit mass.

The present invention also provides a method of producing an electrode for an electrochemical cell or a supercapacitor containing a non-aqueous liquid electrolyte, comprising a first layer containing the electrochemically active material and a microporous second layer constituted by a polymeric material. The method comprises the following steps:

producing the first layer;

coating the first layer with a film of a solution of the polymer in a volatile solvent;

then bringing the film into contact with a first volatile non-solvent which is miscible with the solvent;

finally, drying the electrode to eliminate the solvent and the non-solvent.

The solvent is an organic solvent selected from cyclohexanone, dichloromethane, dimethylacetamide (DMA), dimethylformamide (DMF), hexamethylphosphoramide (HMP), dimethylsulfoxide (DMSO), triethylphosphate (TEP), 1-methyl-2-pyrrolidone or N-methylpyrrolidone (NMP), and mixtures thereof. Preferably, an organic solvent is used in which the polymer dissolves without difficulty and which can readily be eliminated by heating at a moderate temperature without risking damage to the active material.

The selected polymer is taken up in a concentrated solution in the solvent. The concentration of polymer must not be too high since that is one of the parameters which determines the porosity of the second layer; preferably, the solution contains at least 50% of solvent.

In a variation, the solution also contains a non-solvent in a proportion which is insufficient to cause precipitation of the polymer. The term "non-solvent" means a liquid in which the polymer is not soluble (strong non-solvent) or is only very slightly soluble (weak non-solvent) at the operating temperature. When the non-solvent selected is pure water or a mixture including it, this temperature is in the range 5° C. to 80° C. The presence of a small quantity of a weak non-solvent encourages the three-dimensional organization of the polymer during precipitation.

The dissolved polymer is deposited on the surface of the first layer of the electrode using a known method such as immersion, coating, spray coating, etc. . . . This surface contains irregularities and a certain porosity which are filled in by the solution and which facilitate bonding of the second layer.

In a variation of the method of the invention, the first layer is superficially impregnated with a wetting agent before being covered with the film of dissolved polymer. The wetting agent is, for example, a volatile organic solvent.

The film of dissolved polymer is then placed in contact with the non-solvent. The solvent is then replaced by the non-solvent with which it is miscible, causing precipitation of the polymer. Subsequent recovery of the solvent extracted by the non-solvent is facilitated. If the selected non-solvent is water, the method of the invention has the advantage of not polluting the environment and facilitating recycling of the solvents.

The first and/or second non-solvent is/are selected from water, ethanol ($CH_3OH$), ethylene glycol, glycerol, acetone, propylene carbonate (PC), dichloromethane, ethyl acetate, butanol, pentanol, acetonitrile, and mixtures thereof.

A film of solid polymer thus covers the surface of the electrode. It is sufficient to evaporate the non-solvent, and possibly a portion of the residual solvent, by moderate heating to obtain the electrode of the invention. The steps of the method can be repeated several times if a thicker second layer is desired.

In a further variation, the method also includes a step for cross-linking the polymer after drying the electrode, the solution containing a cross-linking agent. This supplemental step is necessary for some applications where the separator must have greater mechanical strength.

The method of producing an electrode of the invention comprises simple operations which allow continuous production of all the constituents of the electric cell. By omitting the step of cutting out a separator as a component, the loss of material which normally occurs because of cutting scrap is avoided, and thus the quantity of lost material is minimized. As a result, the cost of producing the electrode of the present invention is lower than that of a prior art electrode associated with a conventional separator. By limiting the number of operations, an electrode-separator assembly is obtained which is simpler and more reliable to produce than by using known methods.

Other features and advantages of the present invention become apparent on reading the following examples of embodiments which, of course, are given by way of illustration and are in no way limiting, described with reference to the accompanying drawings in which.

EXAMPLE 1

Figure 1:
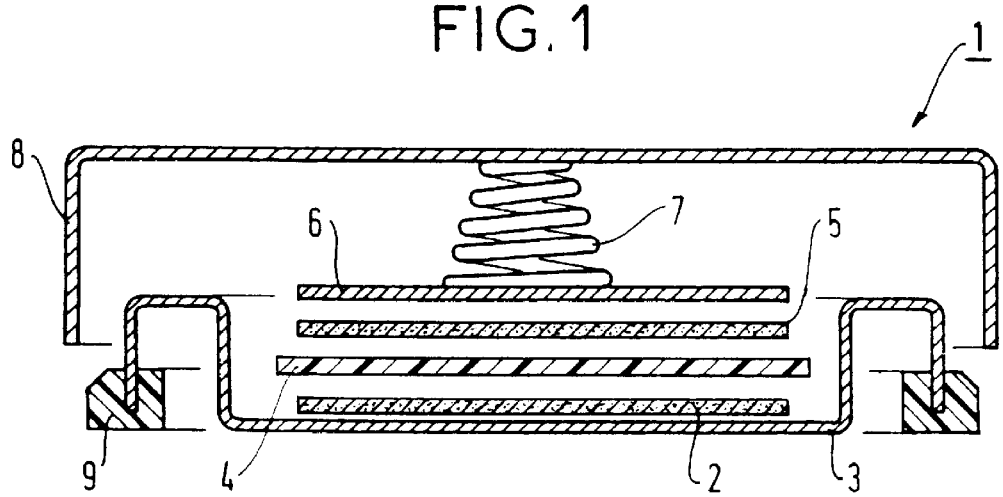
FIG. 1 is an exploded sectional view of a button type lithium cell of the prior art.

In order to test a prior art electrode, a button type lithium cell 1 as shown in FIG. 1 was produced.

The electrolyte was a solution of a mixture of lithium salts in a non-aqueous solvent. The non-aqueous solvent was composed of 20% of propylene carbonate (PC), 20% of ethylene carbonate (EC) and 60% of dimethyl carbonate (DMC), in which was dissolved a mixture of lithium salts composed of lithium trifluoromethanesulfonimide LiN$(CF_3SO_2)_2$ (LiTFSI) at a concentration of 1.5M and lithium perchlorate $LiClO_4$ at a concentration of 0.1M.

Positive electrode 2 was composed of a current collector on which a layer constituted by 90% by weight of graphite mixed with a PVDF polymer binder had been deposited. The electrode was dried at 110° C. then impregnated with electrolyte and hot rolled before being positioned in the cell can 3.

Separator 4 was constituted by a polypropylene sheet with 45% porosity, a thickness of 50 $\mu$m and diameter 22 mm, with the trade name "CELGARD 2502". The separator was impregnated with electrolyte and positioned on positive electrode 2.

Negative electrode 5 was a 14 mm diameter pellet of lithium metal. A stainless steel spacer 6 ensured current pick-up and a spring 7 kept the different elements of the cell in contact. The cell was covered by a cap 8 and gasket 9 ensured that the cell was sealed.

Figure 4:
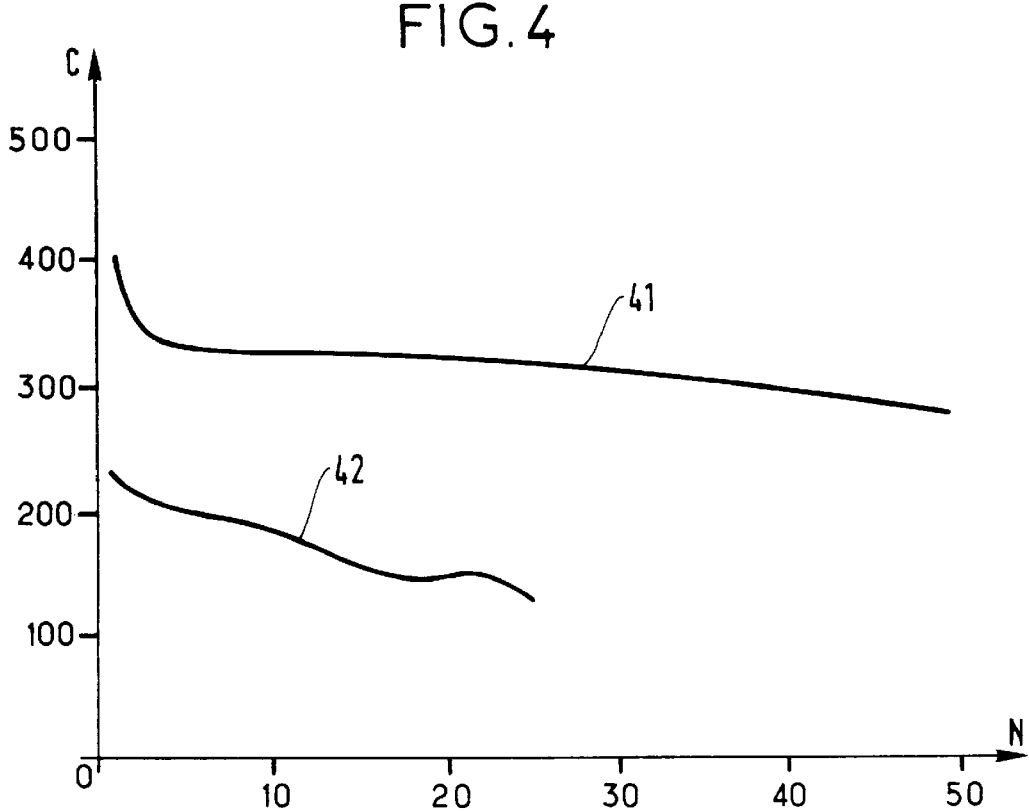
FIG. 4 is a graph with curves showing variation in the capacity C (in mAh/gram (g)) discharged by a cell of the invention and by a prior art cell as a function of number of cycles during cycling.

Cell 1 was cycled between 0 and 2 volts at a current of 20 mA/g of graphite. FIG. 4 shows the discharge curve 42 of prior art cell 1. The initial capacity was 240 mAh/g of graphite. After 25 cycles, it was no more than 150 mAh/g, meaning a reduction in capacity of 37.5%.

EXAMPLE 2

Figure 3:
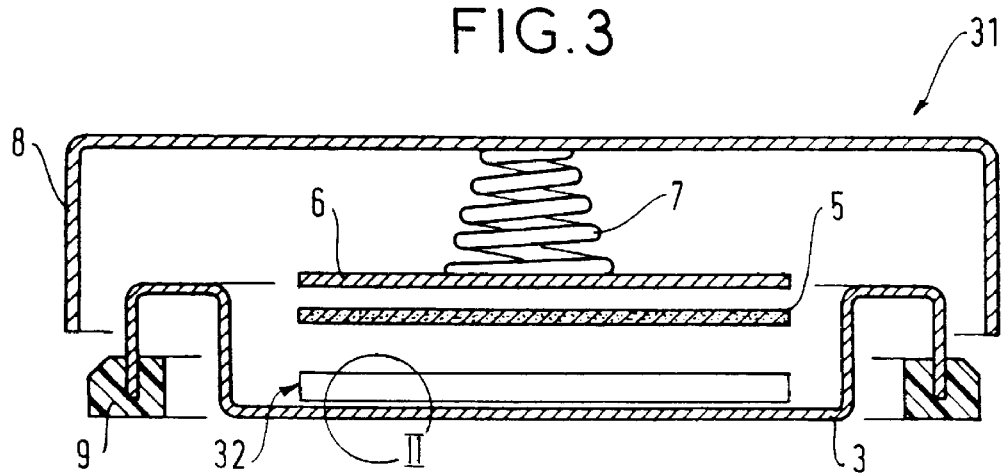
FIG. 3 is analogous to FIG. 1 for a lithium cell comprising an electrode in accordance with the present invention.

In order to test an electrode in accordance with the present invention, a button type electric cell 31 was produced as shown in the exploded view of FIG. 3, comprising an electrode 32 in accordance with the invention.

Figure 2:
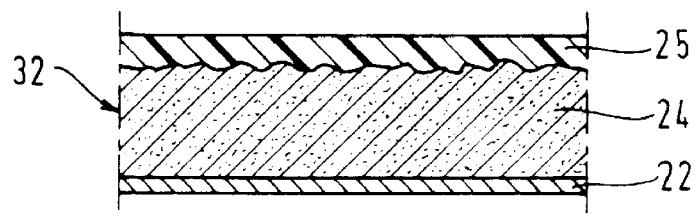
FIG. 2 is a partial schematic view of an electrode in accordance with the present invention.
Figure 6:
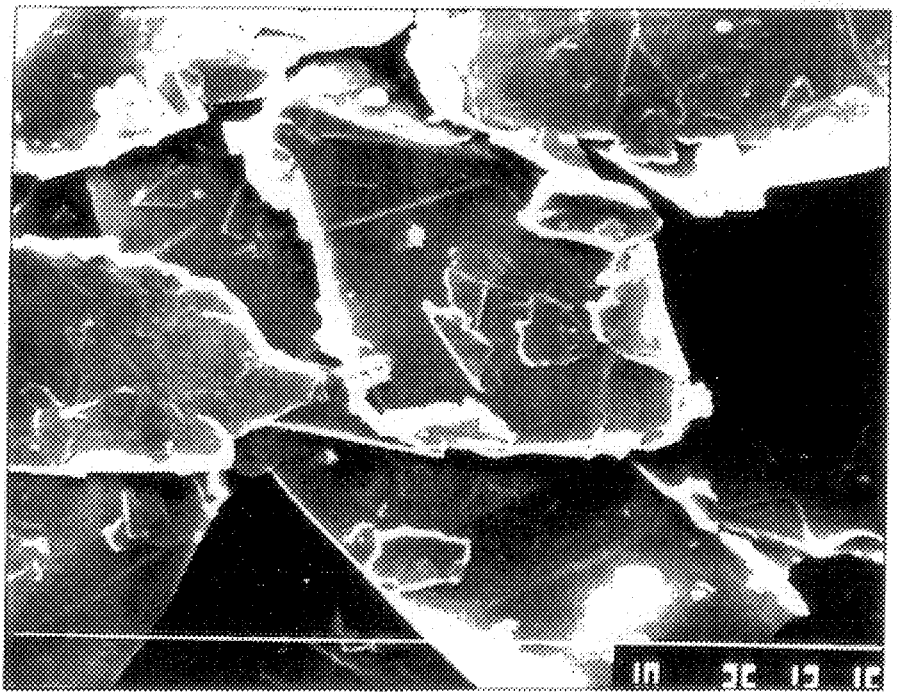
FIG. 6 is an electron micrograph (0.5 cm=1 $\mu$m) showing the surface of the first layer of the electrode.

FIG. 2 is a fragmentary section view of portion II of electrode 32. Electrode 32 was composed of a current collector of copper foil; on one of its two faces, a first layer 24 had been deposited from a paste constituted by at least 90% by weight of graphite mixed with 10% of a PVDF polymer binder. The electrode was dried at 110° C. then hot rolled. Its surface can be seen in FIG. 6.

Figure 7:
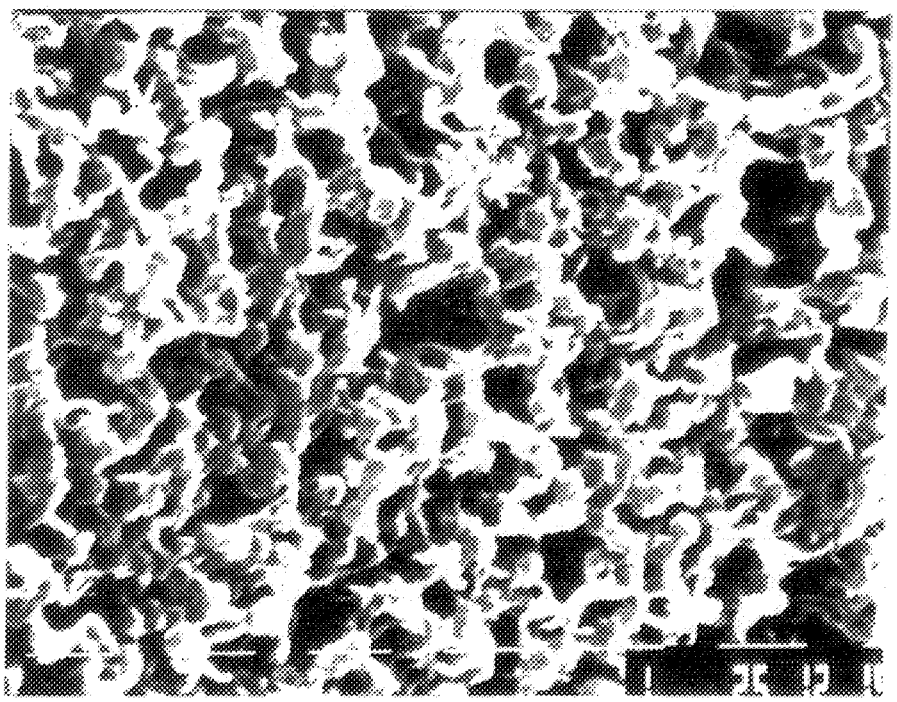
FIG. 7 is an electron micrograph (1 cm=1 $\mu$m) showing the surface of the second layer of the electrode, in accordance with the invention.

Production of the second layer 25 of electrode 32 comprised the following steps. The face of first layer 24 opposite to current collector 22 was coated with a solution containing 12.5% by weight of PVDF and 87.5% of TEP to deposit a film of solution on its surface. After draining, the electrode was immersed in water for 20 minutes. The polymer was caused to precipitate since the water was a strong non-solvent. The electrode was then dried in air, firstly at 35° C. then at 120° C., to remove all traces of water. A solid PVDF layer of thickness 50 $\mu$m and porosity 75% was obtained, which adhered strongly to the first layer. Its resistivity was about five times lower than that of the separator described in Example 1. Its surface can be seen in FIG. 7.

The prepared electrode was impregnated with an electrolyte with the same composition as that described in Example 1 to cause swelling of the second layer. It was positioned in cup 3 so that current collector 23 was in contact with cup 3. A lithium metal anode 5 was placed above it, directly in contact with the second layer 25. A stainless steel spacer 6 ensured current pick-up and spring 7 kept the different elements of the cell in contact. The assembly was covered with a cap 8, and gasket 9 ensured the cell was sealed.

Cell 31 was cycled between 0 and 2 volts at a current of 20 mA/g of graphite. FIG. 4 shows the discharge curve 41 of cell 31 of the invention. The initial capacity was 350 mAh/g of graphite. After 50 cycles, it was 300 mAh/g, i.e., a reduction limited to 14.3%. Initially, the capacity of cell 31 of the invention was greater by 46% than that of the prior art cell 1 described in Example 1, and this value was maintained over more than 50 cycles.

EXAMPLE 3

In order to test an electrode of the present invention, an electric cell which was analogous to that of Example 2 was produced, but in which the second layer of the positive electrode was produced as follows.

The face of the first layer was coated with a solution of 9.1% by weight of PVDF, 54.5% of NMP and 36.4% of ethanol to deposit a film of solution on its surface. After draining, the electrode was immersed in water at 80° C., and then dried in air at 35° C. A solid PVDF layer with a porosity of 25% was obtained.

EXAMPLE 4

In order to test an electrode of the present invention, a button type supercapacitor was produced which includes an electrode of the invention. The electrode was composed of a current collector which was an aluminum sheet of thickness 20 µm. One of its two faces was coated, using a blade, with a paste constituted by 80% by weight of activated charcoal with the trade name "SX ULTA NORIT" mixed with 20% of a PVP polymer binder in aqueous solution. The electrode was dried for one hour at 110° C. then hot rolled. The surface of the first layer was then impregnated with a wetting agent composed of a mixture of equal volumes of ethanol and PC.

This also meant that air bubbles could be readily eliminated and PVDF penetration into the electrode could be limited.

Production of the second layer involved the following operations. A plate whirler (spinning disk) was used to spread a solution containing 9.5% by weight of PVDF, 40% of NMP and 50.5% of PC as a weak non-solvent on the surface of the first layer. The electrode was immersed in water for 15 to 20 minutes to cause precipitation of the polymer. The electrode was dried in air at 35° C. then 110° C. to eliminate all traces of water and solvents. A layer of PVDF of 50 µm thickness and 50% porosity was obtained, which could not be separated from the first layer.

Figure 5:
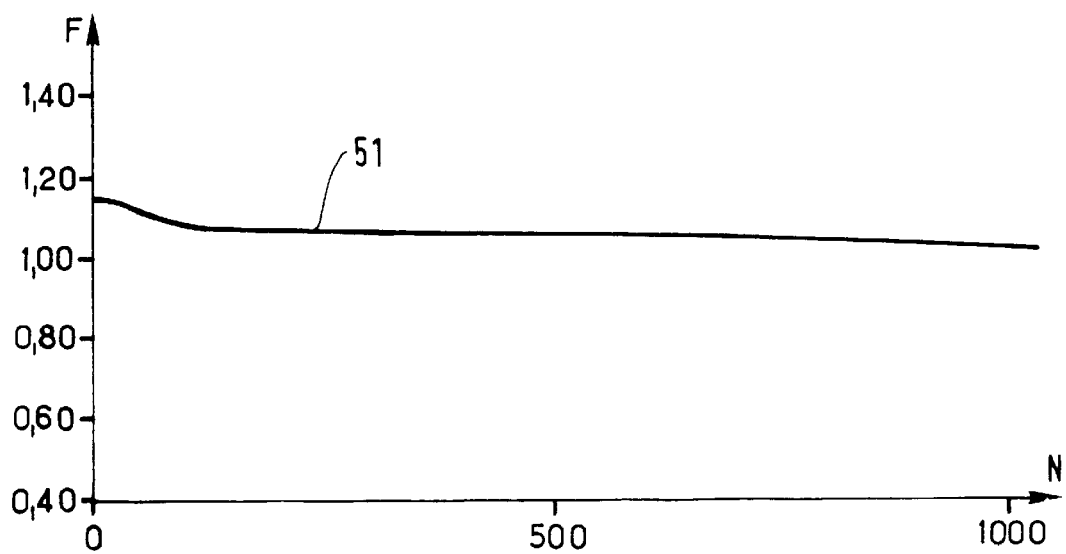
FIG. 5 is a graph with a curve showing variation in the capacitance F (in Farads) discharged by a supercapacitor of the invention during cycling.

The prepared electrode was combined with an analogous counter-electrode without the second layer. The electrolyte was a mixture of PC and ethylammonium tetrafluoroborate $Et_4NBF_4$ at a concentration of 1M The supercapacitor was discharged several times at a current of 1 mA/g of activated charcoal. FIG. 5 shows how the capacitance (curve 51) of the supercapacitor of the invention varied during cycling. Excellent stability of capacitance can be seen over more than 1000 cycles.

EXAMPLE 5

In order to test an electrode of the present invention, a button type supercapacitor analogous to that of Example 3 was assembled, however it included two electrodes of the invention placed face to face so that the second layers of the two electrodes were in contact. In this case, the thickness of the second layer of each electrode was 20 µm. The presence of the second layer improved the mechanical strength of each of the electrodes. Further, the quantity of polymer used could be minimized compared with the case where the separator was carried by one electrode only. In this case the total thickness of the second layers was only 40 µm.

The present invention is not limited to the embodiments described and shown, but can be varied in a number of ways which are available to the skilled person without departing from the spirit of the invention. In particular, without going beyond the ambit of the invention, the first layer could be produced from any known electrochemically active electrode material and any normal polymeric binder. The electrode of the invention can be assembled in electrochemical elements of various geometric shapes and dimensions: cylindrical, prismatic, etc. . . .

We claim:

1. An electrochemical cell or supercapacitor containing a non-aqueous liquid electrolyte and an electrode, the electrode comprising an electrically conductive porous layer having at least one face covered by a microporous, coagulated polymeric layer, wherein said polymeric layer is intimately connected to said face and is produced by precipitation of said polymer using a non-solvent from a solution of said polymer impregnating said face.

2. An electrochemical cell or supercapacitor according to claim 1, in which the microporous, coagulated polymeric layer has a pore volume in the range 30% to 95%.

3. An electrochemical cell or supercapacitor according to claim 1, in which the microporous, coagulated polymeric layer has a thickness in the range 10 µm to 100 µm.

4. An electrochemical cell or supercapacitor according to claim 1, in which said microporous, coagulated polymeric layer comprises a polymeric material selected from poly (vinylidene fluoride), poly(vinyl chloride), poly(methyl methacrylate), cellulose acetate, a polysulfone, a polyether, or a polyolefin, and copolymers thereof.

5. An electrochemical cell or supercapacitor according to claim 1, in which said microporous, coagulated polymeric layer comprises a polymeric material which is an alloy of poly(vinylidene fluoride) with a polymer selected from a polysulfone, poly(methyl methacrylate) and poly (vinylpyrrolidone), and copolymers of poly(vinylidene fluoride) and poly(tetrafluoroethylene), of poly(vinylidene fluoride) and propylene hexafluoride, or of vinyl acetate and vinyl alcohol.

6. An electrochemical cell or supercapacitor according to claim 1, in which said microporous, coagulated polymeric layer also contains a wetting agent in a proportion of less than 10% by weight of said polymer.

7. An electrochemical cell or supercapacitor according to claim 1, in which said microporous, coagulated polymeric layer comprises a cross-linked polymeric material.

8. An electrochemical cell or supercapacitor according to claim 1, further containing a current conducting support.

9. An electrochemical cell or supercapacitor according to claim 8, in which said support is positioned in contact with said at least one face of said electrically conductive porous layer and said microporous, coagulated polymeric layer adheres to a second face of said electrically conductive porous layer.

10. An electrochemical cell or supercapacitor according to claim 8, in which said support is included in said electrically conductive porous layer and said microporous, coagulated polymeric layer adheres to both faces of said electrically conductive porous layer.

11. A supercapacitor including an electrode in accordance with claim 1, in which said electrically conductive porous layer contains an electrochemically active material selected from activated charcoal and a transition metal oxide, and said microporous, coagulated polymeric layer is constituted by poly(vinylidene fluoride).

12. An electrochemical cell including an electrode in accordance with claim 1, in which said electrically conductive porous layer contains an electrochemically active material selected from materials which can intercalate an alkaline cation, and said microporous, coagulated polymeric layer is constituted by a poly(vinylidene fluoride) polymeric material.

13. A method of producing an electrode, comprising the following steps:

(a) providing an electrically conductive porous layer;

(b) coating said electrically conductive porous layer with a film of a solution of a polymer in a volatile solvent, the polymer is selected from:

(A) poly(vinylidene fluoride), poly(vinyl chloride), poly(methyl methacrylate), cellulose acetate, a polysulfone, a polyether, a polyolefin, and copolymers thereof; or (B) an alloy of poly(vinylidene fluoride) with a polymer selected from a polysulfone, poly(methyl methacrylate) and poly(vinylpyrrolidone), and copolymers of poly(vinylidene fluoride) and poly(tetrafluoroethylene), of poly(vinylidene fluoride) and propylene hexafluoride, or of vinyl acetate and vinyl alcohol;

(c) after coating step (b), bringing said film into contact with a volatile non-solvent which is miscible with said solvent, whereby an electrode is formed;

(d) drying said electrode of step (c) to eliminate said solvent and said non-solvent.

14. A method of producing an electrode according to claim 13, in which said solvent is an organic solvent selected from cyclohexanone, dichloromethane, dimethylacetamide, dimethylformamide, hexamethylphosphoramide, dimethylsulfoxide, triethylphosphate, N-methylpyrrolidone, and mixtures thereof.

15. A method of producing an electrode according to claim 13, in which said solution also comprises a non-solvent in a proportion which is insufficient to cause precipitation of the polymer.

16. A method of producing an electrode according to claim 13, in which said non-solvent is selected from water, ethanol, ethylene glycol, glycerol, acetone, propylene carbonate, dichloromethane, ethyl acetate, butanol, pentanol, acetonitrile, and mixtures thereof.

17. A method of producing an electrode according to claim 13, in which said electrically conductive porous layer is superficially impregnated with a wetting agent before being covered with said film of said solution of said polymer.

18. A method of producing an electrode according to claim 13, further comprising a step for cross-linking said polymer after drying said electrode, said solution containing a cross-linking agent.

* * * * *